United States Patent [19]

Aharon et al.

[11] Patent Number: 5,144,479
[45] Date of Patent: Sep. 1, 1992

[54] COMBINED TELESCOPE AND AUTOCOLLIMATOR

[76] Inventors: Yehudit Aharon; Oren Aharon, both of 23rd, Shikma st., Haifa 34739; Any Cohen, 39/5 Mimon st., Haifa 32588, all of Israel

[21] Appl. No.: 714,308

[22] Filed: Jun. 12, 1991

[30] Foreign Application Priority Data

Jun. 21, 1990 [IL] Israel ......................... 094811

[51] Int. Cl.⁵ ................. G01B 11/26; G02B 23/04; G02B 27/32
[52] U.S. Cl. ............................. 359/424; 359/428; 356/153
[58] Field of Search ............. 359/424, 428, 427, 505, 359/389, 419; 356/150, 153, 247

[56] References Cited

U.S. PATENT DOCUMENTS

| | | | |
|---|---|---|---|
| 1,016,606 | 2/1912 | Berger | 359/428 |
| 2,701,501 | 2/1955 | Cuny | 356/153 |
| 3,533,680 | 10/1970 | Edelstein | 356/153 |
| 3,628,869 | 12/1971 | Clay et al. | 356/153 |
| 3,721,488 | 3/1973 | Kuhne | 356/153 |
| 3,782,829 | 1/1974 | Herriott | 356/153 |
| 3,810,699 | 5/1974 | Courtney-Pratt | 356/153 |
| 3,936,194 | 2/1976 | Lipkins | 356/153 |
| 4,199,256 | 4/1980 | Forshufvud et al. | 356/247 |

Primary Examiner—Jon W. Henry
Attorney, Agent, or Firm—Browdy and Neimark

[57] ABSTRACT

A riflescope or other telescope is used as a target projector and as a collecting telescope for the reflected light. The light source is placed at the usual eye position of the telescope, projected through the ocular and then through the objective lens of the telescope. The reflected beam is recollected by the objective lens and forms an image on the telescope reticule. The image is presented to the eye through the ocular and a beamsplitter.

3 Claims, 2 Drawing Sheets

COMBINED TELESCOPE AND AUTOCOLLIMATOR

BACKGROUND

Autocollimators are used for determination of minute relative angles of reflecting surfaces. They project a light-beam through a telescopic lens and recollect the reflection through the same lens.

With reference to FIG. 1, one can see that prior-art autocollimators are built from: a light-source (1), an accurate beam-splitter (2), a source reticle (3), an ocular (4), an objective (5) and an eyepiece reticule (6). The light source (1) that projects a target pin-hole or a crosshair target, is reflected through the objective (5), to produce a basically collimated beam.

The light from the reflecting surface is collected by the same lens system and is split by the beam-splitter (2). The image is formatted on the eyepiece reticule (6) and is presented to the eye via the ocular (4).

Minute angular deviations of the reflecting surfaces are represented as position changes of the projected target on the source reticle (3).

The angle deviation equates with the linear movement: $D = F \cdot 2\alpha$, where F is the focal length of the system and $\alpha$ is the angular deviation.

This invention is introduced in attempt to achieve the same autocollimation affect without using a special design autocollimator but rather using typical standard scopes, particularly riflescopes.

This approach introduces a potentially low-cost and accurate autocollimator.

SUMMARY OF INVENTION

In accordance with the invention, a telescope particularly a riflescope) is used as a target projector and as a collecting telescope for the reflected light.

The light-source is placed at the usual eye-position of the telescope, projected through the ocular and then through the objective lens of the telescope.

The reflected beam is recollected by the objective lens and forms an image on the riflescope reticle. The image is presented to the eye through the ocular and the beam-splitter.

DETAILED DESCRIPTION

The proposed autocollimator is composed of: A telescope or a riflescope (11), a light-source (1), and a beam-splitter (2) (or some other means of projecting the light into the eyepiece reticule without obstructing the image displayed by the telescope to the viewer's eye).

Figure 1:
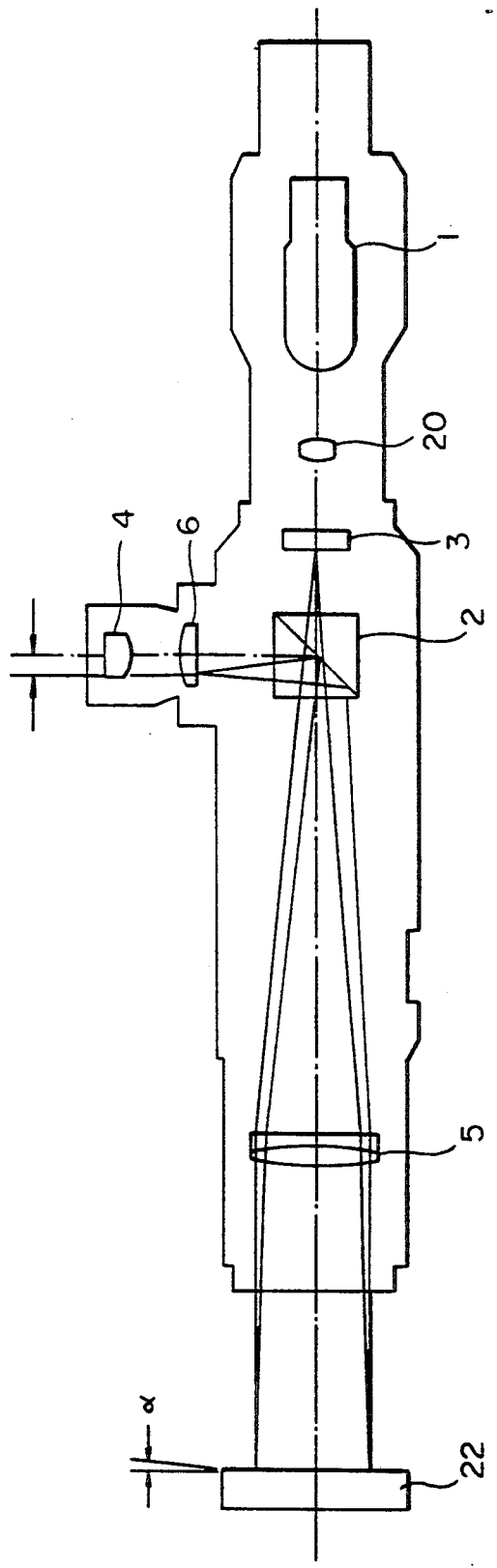
FIG. 1 shows a prior art autocollimator.
Figure 2:
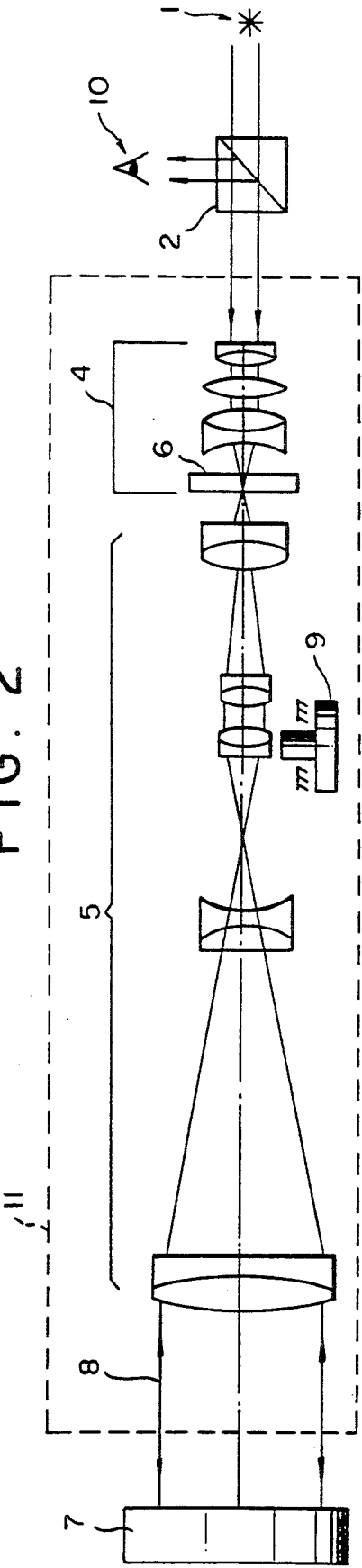
FIG. 2 shows an embodiment of the invention.

FIG. 2 shows the view of the proposed autocollimating telescope with image reversal system, post ocular beam-splitter and light source. With reference to this figure: a light source (1) is located at the usually eye-position of the ocular (4). The ocular (4) is referred to have a long eye-relief.

The light-source (1) passes through a beam-splitter (2), illuminates the telescope's built-in eyepiece reticule (6) and projects it through the objective lens and image reversal system (5) of the telescope.

The projected beam is reflected off the examined mirror (7) and points back to the telescope.

The incoming beam (8) is recollected by the same objective-lens (5) and it's image is formatted on the telescope's reticule (6). Thus, the reticule is used both as a source reticule and as an eyepiece reticule.

Both images on the reticule are viewed by the user through the ocular (4) and the beam-splitter (2).

Figure 3:
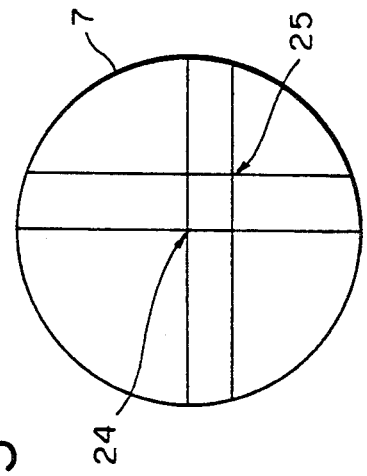
FIG. 3 shows the displacement of the reflected reticule image from the source reticle image using the invention.

Minute changes in the perpendicularity of the examined mirror (7) (or other reflecting surfaces) will cause two images i.e. the source reticule image (24) and the reflected reticule image (25), to be displayed to the eye (10), as seen in FIG. 3.

Using special adjusting knobs (9), one can align the system and bring the two images of the reticule (6) to coincide.

It is easily understood that the light-source position (1) and the eye-position (10) are interchangeable without affecting the performances, and that the same method is applicable to different kinds of telescopes and riflescopes.

What is claimed is:

1. An optical autocollimator for alignment, comprising a telescope; a light source that illuminates an eyepiece reticule of said telescope through an eyepiece of said telescope; a light projecting means for projecting the light into the eyepiece reticule without obstructing the image displayed by the telescope when observed through said light projecting means, wherein said eyepiece reticule provides both a source reticle and an image formation are for said telescope.

2. An optical autocollimator for alignment according to claim 1, further comprising a light-source, wherein said light projecting means comprises a beam-splitter between an observation point and an exterior surface of the eyepiece, and a telescope.

3. An optical autocollimator for alignment according to claim 2, wherein said telescope comprises a riflescope.

* * * * *